United States Patent
Meolche et al.

(10) Patent No.: US 8,873,199 B2
(45) Date of Patent: Oct. 28, 2014

(54) RECORDING HEAD COIL STRUCTURE

(71) Applicant: Seagate Technology LLC, Cupertino, CA (US)

(72) Inventors: Eric Roger Meolche, Burnsville, MN (US); Chris Rea, Edina, MN (US); Jianhua Xue, Maple Grove, MN (US); Eric Linville, Shakopee, MN (US); John M. Wolf, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/216,636

(22) Filed: Mar. 17, 2014

(65) Prior Publication Data

US 2014/0268416 A1 Sep. 18, 2014

Related U.S. Application Data

(63) Continuation of application No. 13/419,017, filed on Mar. 13, 2012, now Pat. No. 8,687,318.

(51) Int. Cl.
*G11B 5/127* (2006.01)
*G11B 5/17* (2006.01)

(52) U.S. Cl.
CPC .................................. *G11B 5/17* (2013.01)
USPC .................................... 360/123.04

(58) Field of Classification Search
USPC ............... 360/123.04, 123.05, 125.12, 125.3, 360/125.31, 123.06, 123.03, 125.18, 360/123.09, 125.15, 125.17, 125.03
See application file for complete search history.

(56) References Cited

U.S. PATENT DOCUMENTS

| | | |
|---|---|---|
| 4,825,318 A | 4/1989 | Hoo et al. |
| RE33,949 E | 6/1992 | Mallary et al. |
| 5,703,740 A | 12/1997 | Cohen et al. |
| 6,163,435 A | 12/2000 | Gaud et al. |
| 6,195,232 B1 | 2/2001 | Cohen |
| 6,335,846 B1 | 1/2002 | Gaud et al. |
| 6,441,994 B1 | 8/2002 | Wang et al. |
| 6,710,972 B1 | 3/2004 | Mochizuki et al. |
| 7,031,108 B2 | 4/2006 | Mochizuki et al. |
| 7,075,756 B1 | 7/2006 | Mallary et al. |
| 7,126,788 B1 | 10/2006 | Liu et al. |
| 7,180,704 B2 | 2/2007 | Mochizuki et al. |

(Continued)

FOREIGN PATENT DOCUMENTS

| | | |
|---|---|---|
| EP | 1921611 A2 | 5/2008 |
| EP | 1921611 A3 | 10/2008 |

(Continued)

OTHER PUBLICATIONS

Kazuyuki Ise et al., "Writing performance of cusp-field single-pole head" Akita Research Institute of Advanced Technology, Japan, Journal of Magnetism and Magnetic Materials 235, pp. 187-190, 2001.

(Continued)

*Primary Examiner* — Allen T Cao
(74) *Attorney, Agent, or Firm* — HolzerIPLaw, PC

(57) ABSTRACT

A recording head comprising a write pole and a coil structure asymmetric with respect to the write pole and configured to generate more magnetic flux on a trailing side of the main pole than the magnetic flux on a front side of the main pole.

20 Claims, 8 Drawing Sheets

(56) References Cited

U.S. PATENT DOCUMENTS

| | | |
|---|---|---|
| 7,227,727 B2 | 6/2007 | Santini |
| 7,443,632 B1 | 10/2008 | Stoev et al. |
| 7,593,187 B2 | 9/2009 | Aoki |
| 7,612,963 B2 | 11/2009 | Allen et al. |
| 7,768,744 B2 | 8/2010 | Hsiao et al. |
| 7,813,085 B2 | 10/2010 | Anagawa et al. |
| 7,839,605 B2 | 11/2010 | Parker |
| 7,898,767 B2 | 3/2011 | Yamanaka et al. |
| 8,035,920 B2 | 10/2011 | Na et al. |
| 8,035,921 B2 | 10/2011 | Sunwoo |
| 8,179,633 B2 | 5/2012 | Contreras et al. |
| 8,201,320 B2 | 6/2012 | Allen et al. |
| 8,437,102 B2 | 5/2013 | Maruyama et al. |
| 2004/0184189 A1 | 9/2004 | Mochizuki et al. |
| 2005/0207061 A1 | 9/2005 | Mochizuki et al. |
| 2005/0213244 A1 | 9/2005 | Mochizuki et al. |
| 2006/0002020 A1 | 1/2006 | Pokhil et al. |
| 2006/0176601 A1 | 8/2006 | Amin et al. |
| 2007/0146929 A1 | 6/2007 | Maruyama et al. |
| 2008/0019041 A1 | 1/2008 | Aoki |
| 2008/0030905 A1 | 2/2008 | Yamanaka et al. |
| 2008/0068748 A1* | 3/2008 | Olson et al. .................. 360/110 |
| 2008/0112080 A1 | 5/2008 | Lengsfield et al. |
| 2008/0316646 A1 | 12/2008 | Na et al. |
| 2010/0254042 A1 | 10/2010 | Contreras et al. |
| 2011/0038081 A1* | 2/2011 | Contreras et al. ........ 360/125.03 |
| 2011/0051288 A1* | 3/2011 | Contreras et al. .......... 360/234.3 |
| 2011/0273796 A1 | 11/2011 | Biskeborn et al. |
| 2012/0154954 A1* | 6/2012 | Hsiao et al. ................ 360/246.2 |

FOREIGN PATENT DOCUMENTS

| | | |
|---|---|---|
| JP | 2004-164783 A | 6/2004 |
| JP | 2008-123666 A | 5/2008 |
| JP | 2009-048719 A | 3/2009 |
| JP | 2011-048895 A | 3/2011 |

OTHER PUBLICATIONS

European Search Report, European Application No. EP 13 159 023, Jul. 22, 2013, Seagate Technology LLC, 5 pages.

* cited by examiner

RECORDING HEAD COIL STRUCTURE

PRIORITY CLAIM

The present application is a continuation application of U.S. patent application Ser. No. 13/419,017, filed Mar. 13, 2012, and titled "Recording Head Coil Structure", and expected to issue on Apr. 1, 2014 as U.S. Pat. No. 8,687,318, which is hereby incorporated by reference in its entirety.

BACKGROUND

A disc drive having one or more sliders that are positioned over a data storage medium (i.e., one or more discs) is an example of a data storage system that uses magnetic fields for writing and reading data. The sliders carry transducers, which write information to and read information from data surfaces of the discs. In one example, transducers include a recording or write head for generating a magnetic field that aligns the magnetic moments of a magnetic medium to represent desired bits of data. Magnetic recording heads include both longitudinal and perpendicular recording techniques. Perpendicular recording is a form of magnetic recording in which magnetic moments representing bits of data are oriented perpendicularly to the surface of the recording layer. Perpendicular magnetic write heads typically include main and return poles that are separated to form a write gap and extend from pole tips located at an air-bearing surface (ABS) to a back gap region. A coil is included to generate magnetic signals through the main and return poles in response to a current conducted through the coil. The main pole tip focuses the magnetic flux density such that the magnetic fields interact with the magnetic medium to orient its magnetic moments in an up or down direction.

SUMMARY

Implementations described and claimed herein provide a recording head comprising a write pole and a coil structure asymmetric with respect to the write pole and configured to generate more magnetic flux on a trailing side of the main pole than the magnetic flux on a front side of the main pole.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

DETAILED DESCRIPTIONS

With the further push to increase areal density, perpendicular recording writers are required to generate large write fields and field gradients in the recording layer of the magnetic media. However, the write field from recording writer's main pole is generally limited by the maximum magnetic moment of the head material and the pole geometry. To further increase the track density in perpendicular magnetic recording, the width of the trailing edge of the main pole needs to get smaller to be able to write narrow tracks.

Achieving increased areal density growth using perpendicular magnetic recording requires a fast writer that generates large write fields with large field gradients for a given track width. The write field and effective field gradient in the media plane can be controlled by tuning the geometry of the main pole near the air bearing surface (ABS), such as the flare angle at the ABS, and the surround shields, the trailing shield, the side shield, etc. A maximum gradient is achieved by carefully controlling the interaction between the main pole and the trailing shield. Specifically, the trailing shield magnetization direction is useful in controlling the dynamic write field gradient during switching of the main pole, and the static write field gradient. In one implementation of recording head, the main pole field drives the dynamics of the trailing shield magnetization. In such passive implementation, the main pole is driven very hard by the amperian field of the coil surrounding the main pole during part of the switching. There is a finite time delay before the flux reaches the trailing shield and starts the reversal of magnetization in the trailing shield. However, the maximum write field gradient is only achieved after the magnetization reversal of the trailing shield is nearly completed.

An implementation of a recording head disclosed herein includes an additional coil turn to drive a trailing return pole and a trailing shield to reduce the phase offset due to the timing delay in the propagation of the flux to the trailing shield and due to the reversal of the magnetization in the trailing shield. Providing such additional coil turn also leads to better dynamic write field gradient. Specifically, the recording head includes an asymmetric coil structure that increases the magnetic flux density in the trailing shield.

Figure 1:
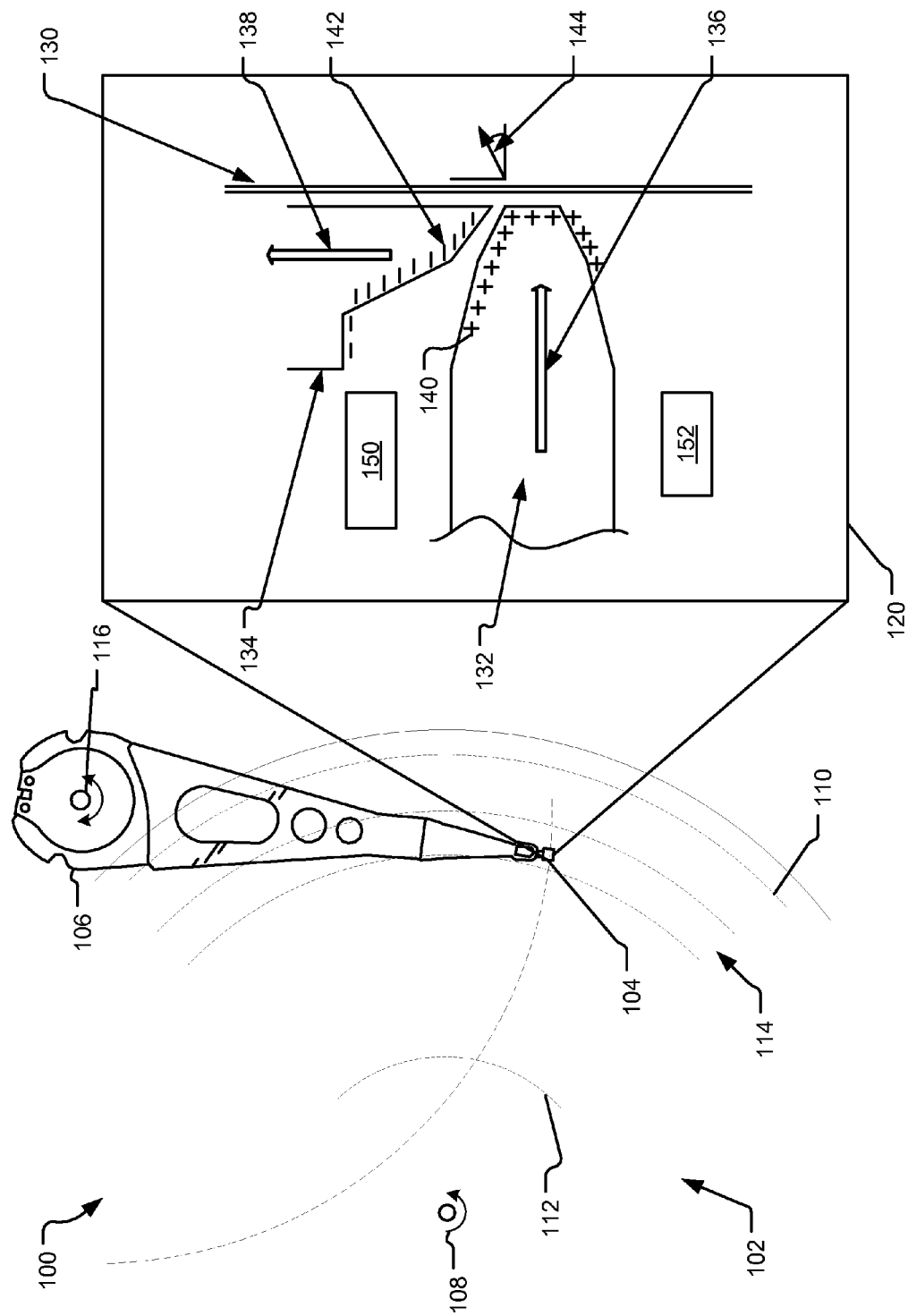
FIG. 1 illustrates a schematic block diagram illustrating an example write pole structure implemented on an end of an actuator assembly.

FIG. 1 illustrates a schematic block diagram 100 illustrating an example recording head structure implemented on an end of an actuator assembly. Specifically, FIG. 1 illustrates a plan view of an implementation of a disc 102 with a transducer head 104 situated on an end of an actuator assembly 106. Disc 102 rotates about a disc axis of rotation 108 during operation. Further, disc 102 includes an outer diameter 110 and inner diameter 112 between which are a number of data tracks 114, illustrated by circular dotted lines. Data tracks 114 are substantially circular and are made up of regularly spaced patterned bits.

Information may be written to and read from the patterned bits on the data tracks 114 through the use of the actuator assembly 106, which rotates during a data track 114 seek operation about an actuator axis of rotation 116 positioned adjacent the disc 102. The transducer head 104 mounted on the actuator assembly 106 at an end distal from the actuator axis of rotation 116 flies in close proximity above the surface of the disc 102 during disc operation. The transducer head 104 includes recording head including a read pole for reading data from the track 114 and a write pole for writing data to the track 114.

In one implementation of the transducer head, the recording head located on the transducer head 114 includes a main pole that is configured to write data to magnetic media. The main pole has a front edge that forms an air bearing surface (ABS) near the magnetic media. Furthermore, the recording head also includes a trailing shield having a surface parallel to the ABS. The transducer head includes a coil structure that generates magnetic charge density at the edges of the main pole and in the trailing shield close to the ABS. The magnetic charge density in the main pole and in the trailing shield close to the ABS produce a magnetic field in the recording media with an angle different from the angle perpendicular to the ABS.

In one implementation, the coil structure of the recording head is configured to generate charge densities at in the edges of the main pole and the trailing shield close to the ABS such that the magnetic field in the media is directed at an angle less than perpendicular to the ABS. Specifically, the angle of the field gradient in the media is deflected towards the trailing shield and away from the direction perpendicular to the ABS.

FIG. 1 also illustrates an expanded view of a partial cross-sectional configuration of the recording head 120. The recording head 120 is illustrated with respect to the ABS 130 of recording media. Specifically, the recording head 120 includes a main pole 132 (also referred to as the write pole) and a trailing shield structure 134. The recording head is energized using an asymmetric coil structure to cause magnetic flux density to be generated in the main pole 132 and the trailing field structure 134. The recording head 120 also illustrates that the magnetization 136 of the magnetic flux in the main pole 132 is perpendicular to the ABS 130 and in the direction of the ABS 130. The direction 142 of the magnetic flux density through the trailing shield 134 is parallel to the ABS 130 and it flows away from the main pole 132. The magnetization 136 leads to a positive magnetic charge density 140 on the edge of the main pole 132. Similarly, the magnetization 138 causes negative magnetic charge density 142 at the surface of the trailing shield 134.

The magnetization 136 and 138 and the magnetic charge densities 140 and 142 cause a magnetic field with a field angle 144 to be generated in the magnetic media. In the present implementation, the coil structure of the recording head 120 is configured to generate the magnetization 136 and 138 and the magnetic charge densities 140 and 142 such that the angle of the magnetic field 144 in the magnetic media is tilted away from the direction perpendicular to the ABS 130 and towards the trailing shield 134. In other words, the magnetic field angle 144 is not substantially perpendicular to the ABS 130.

The recording head 120 disclosed in FIG. 1 includes an asymmetric coil structure having a trailing coil structure 150 and a front coil structure 152. The coil structures 150 and 152 are different from each other in one or more characteristics. Specifically, the characteristics of the trailing coil structure 150 and the front coil structure 152 differ from each other such that the resulting magnetization 136 and 138 and the resulting magnetic charge densities 140 and 142 causes the field angle 144 to be skewed compared to a field angle that is perpendicular to the ABS 130 of the recording media. For example, in one implementation, the trailing coil structure 150 includes more coil turns than the coil turns in the front coil structure 152. In an alternative implementation, the trailing coil structure 150 has a coil that carries more current than the current carried by the coil in the front coil structure 152.

Figure 2:
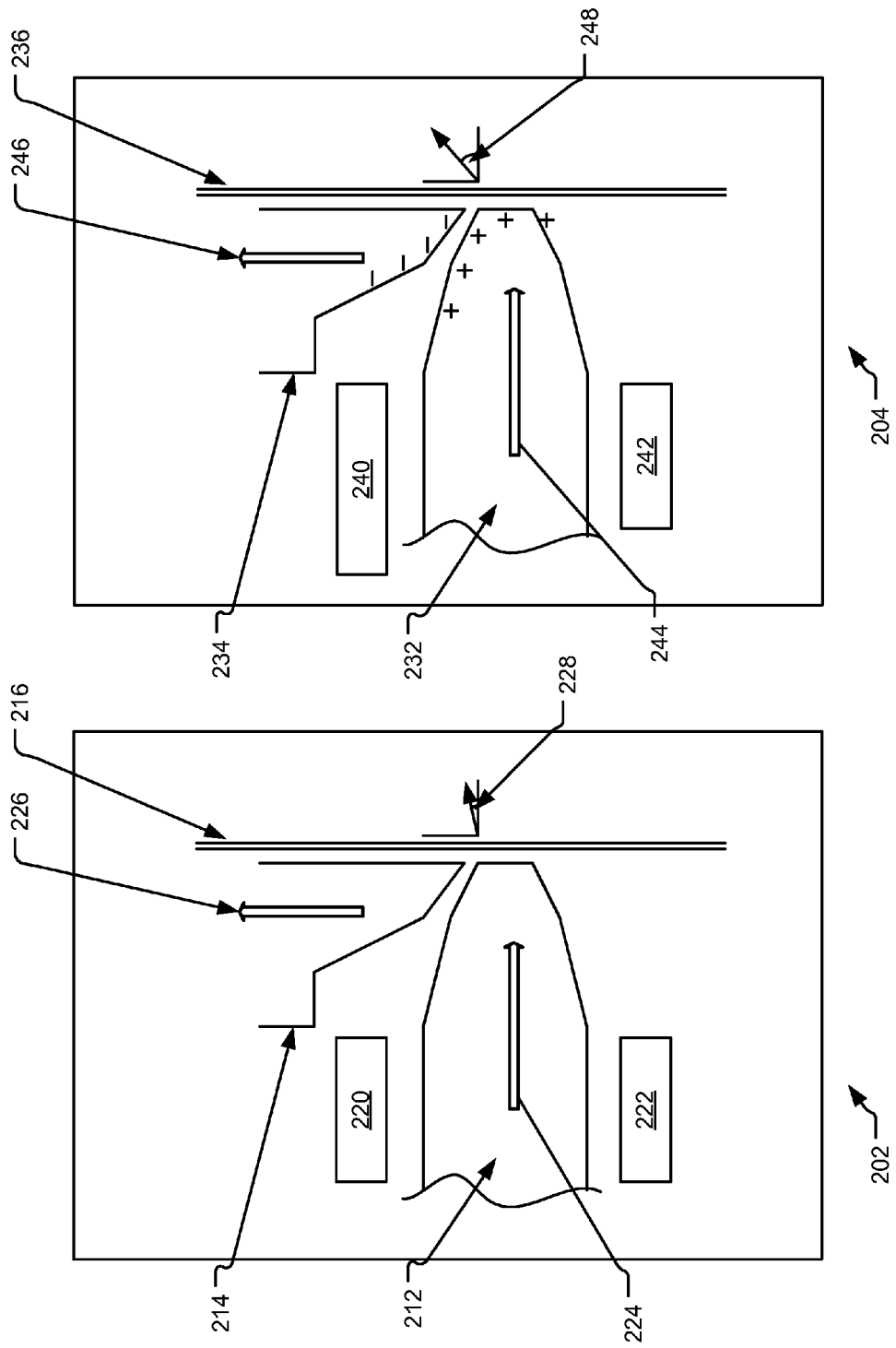
FIG. 2 illustrates block diagrams of two partial cross-sectional configurations of a recording heads.

FIG. 2 illustrates two partial cross-sectional configurations of a recording head. Specifically, FIG. 2 illustrates a first configuration of the recording head 202 wherein the coil structure on the trailing side and the front sides of a main pole is substantially symmetric. Compared to that, in the second configuration of the recording head 204, at least one characteristic of its coil structures on the trailing side and the front sides of a main pole asymmetric in that a coil structure on the trailing side of the main pole has at least one characteristic that is different compared to a corresponding characteristic of a coil structure on the front of the main pole. For example, in one implementation, the number of coil turns in the trailing coil structure is different from the number of coils in the front coil structure. Alternatively, the current flowing in the trailing coil structure is different compared to the current flowing in the front coil structure.

Specifically, the first configuration of the recording head 202 includes a main pole 212 and a trailing shield structure 214 close to an ABS 216. The recording head 202 also includes a trailing coil structure 220 and a front coil structure 222. In one implementation, various characteristics of the trailing coil structure 220 and the corresponding characteristics of the front coil structure 222 are substantially equal. Thus, for example, the number of coil turns for the trailing coil structure 220 is the substantially same as the number of coil turns for the front coil structure 222. Similarly, the current carried in the trailing coil structure 220 is also substantially same as the current carried in the front coil structure 222.

In one implementation, the coil structures 220 and 222 are interconnected with each other. For example, the coil structures 220 and 222 are part of a single helical coil structure such that they both carry current from a single electrical current source. In such an implementation, turns of such helical coil structure wrap around the main pole 212. As a result of the current flowing through the coil structures 220 and 222, a magnetic flux density 224 is generated in the main pole 212 and a magnetic flux density 226 is generated in the trailing shield structure 214. The direction of the current flowing in the coil structures 220 and 222 is selected such that the magnetic flux density is directed towards the ABS 216 and the magnetic flux density 226 is directed along the direction of the ABS 216 and away from the tip of the main pole 212. Such magnetic flux density through the ABS into the magnetic media and may be used to cause perpendicular recording in the media. The balanced coil structures 220 and 222 results in magnetic field in the magnetic media to be at an angle substantially perpendicular to the surface of the magnetic media, with only a slight tilting in the angle of the magnetic field towards the trailing shield structure 214. Such angle of magnetic field is illustrated by the magnetic field vector 228.

Finite element analysis (FEM) of the operation of recording heads show that increasing the angle of magnetization from the angle perpendicular to the surface closest to the main pole 212 results in more efficient recording head operation. To achieve such increased angle of magnetization the second configuration of the recording head 204 includes a coil structures that generate an imbalance in the magnetic flux density around the main pole of the recording head 204.

Specifically, the second configuration of the recording head 204 includes a main pole 232 and a trailing shield structure 234 close to an ABS 236. The recording head 204 also includes a trailing coil structure 240 and a front coil structure 242. In one implementation, various characteristics of the trailing coil structure 240 and the corresponding characteristics of the front coil structure 242 are imbalanced.

Thus, for example, the number of coil turns for the trailing coil structure 240 is not the same as the number of coil turns for the front coil structure 242. Similarly, the current carried in the trailing coil structure 240 is also substantially different from the current carried in the front coil structure 242. Yet alternatively, the trailing coil structure 240 includes at least one pancake coil that wraps around a back via that connects the main pole 232 to a return pole connected to the trailing shield structure 234. Alternatively, the trailing coil structure 240 includes at least one helical coil that wraps around the return pole connected to the trailing shield structure 234.

In one implementation, the coil structures 240 and 242 are interconnected with each other. For example, the coil structures 240 and 242 are part of a single helical coil structure such that they both carry current from a single electrical current source. In such an implementation, turns of such helical coil structure wrap around the main pole 232. As a result of the current flowing through the coil structures 240 and 242, a magnetic flux 244 is generated in the main pole 232 and a magnetic flux 246 is generated in the trailing shield structure 234. The direction of the current flowing in the coil structures 240 and 242 is selected such that the magnetic flux density is directed towards the ABS 236 and the magnetic flux density 246 flows along the direction of the ABS 236 and away from the tip of the main pole 232.

The magnetic flux density in the media is used to cause perpendicular recording in the media. At least one characteristic of the coil structures 240 and 242 is asymmetric so as to result in the magnetic flux density in the trailing side of the main pole 232 to be higher than the magnetic flux density on the front side of the main pole 232. Such asymmetric magnetic flux results in positive magnetic charge accumulation at the tip of the main pole 212 and a negative magnetic charge accumulation at the tip of the trailing field structure 234 close to the main pole 232. The magnetic flux density 244 and 246 and the accumulation of the magnetic charge in the main pole 232 and in the trailing field structure 234, result in an angle of magnetization at the surface of the trailing shield structure 234 closest to the main pole 232 that is substantially different from the angle perpendicular to the ABS 236. Specifically, as illustrated by the magnetic field vector 248, the angle of the magnetic field in the magnetic media is substantially tilted towards the trailing shield structure 234 and away from the direction perpendicular to the ABS. In other words, the tilting of the magnetic field towards the trailing shield structure 234 increases.

Figure 3:
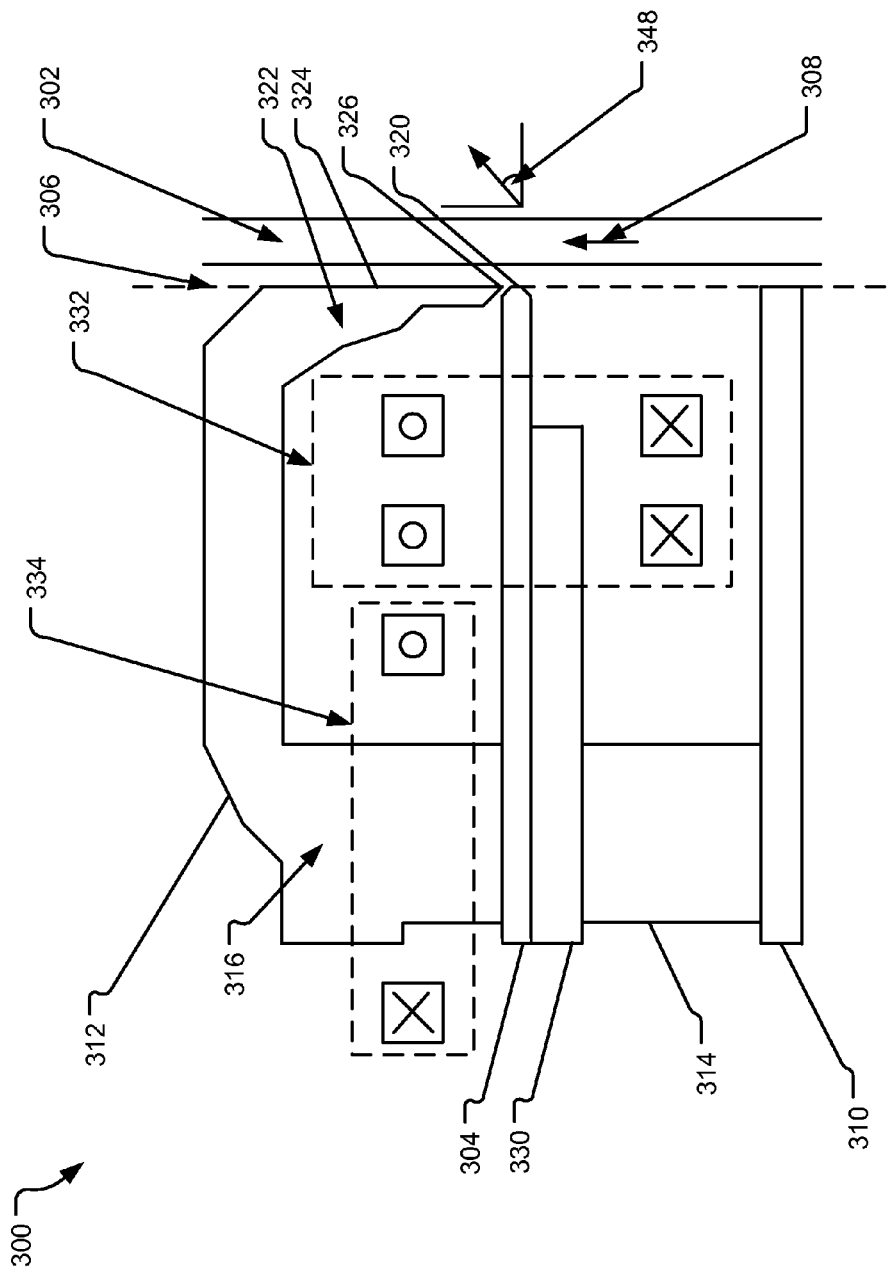
FIG. 3 illustrates an implementation of a recording head including an asymmetric coil structure.

FIG. 3 illustrates an implementation of a recording head 300 including an asymmetric coil structure. The recording head 300, also referred as a read/write transducer, is configured for perpendicular recording to a medium 302. Specifically, the recording head 300 includes a main pole 304 that is configured to write data to the medium 302. Therefore, the main pole 304 is also referred to as the write pole. The main pole 304 includes a surface that defines a portion of an air-bearing surface (ABS) 306 of the recording head 300 and is positioned over a portion of recording medium 302 for recording data thereon. The main pole 304 is made of a ferromagnetic material such as, but not limited to, iron (Fe), cobalt (Co), nickel (Ni), and combinations thereof. For example, main pole 304 can comprise an alloy such as, but not limited to, iron cobalt (FeCo), iron nickel (FeNi), cobalt iron nickel (CoFeNi), and the like.

An implementation of the recording head 300 also includes multiple return poles. With respect to the movement of the recording medium 302 as represented by the numeral 308, a first return pole comprises a leading pole 310 and is positioned on the leading side of main pole 304. Further, a second return pole comprises a trailing pole 312 and is positioned on the trailing side of main pole 304. As illustrated in FIG. 3, the leading pole 310 is separated from main pole 304 and connected with the main pole 304 through a leading back via 314. Similarly, the trailing pole 312 is also connected with the main pole 304 through a trailing back via 316. The main pole 304 includes a main pole tip 320 that forms part of the ABS 306 of the recording head 300. In one implementation of the recording head 300, the trailing pole 312 is connected to a trailing shield 322. The trailing shield 322 includes a surface 324 that also forms part of the ABS 306. Furthermore, the trailing shield 322 also forms a trailing shield tip 326 that is part of the ABS 306 and is close to the main pole tip 320. In an alternative implementation, the recording head 300 also includes a reader (not shown) located near the leading return pole 310 and on the side opposite the main pole 304. The recording head 300 also includes a yoke 330 positioned adjacent to the main pole 304.

An implementation of the recording head 300 includes a helical coil 332 that wraps around main pole 304. Specifically, the helical coil 332 extends between the main pole 304 and the leading return pole 310 and between the main pole 304 and the trailing return pole 312. For example, the helical coil 332 is formed as a helical coil wrapped around the main pole 304. In one embodiment, an insulating material (not shown) electrically insulates the helical coil 332 from the main pole 304 and the leading return pole 310 and from the main pole 304 and trailing return pole 312. In one implementation, each turn of the helical coil 332 is connected in series with the other turns of the helical coil 332. However, any suitable configuration of helical coil 332 can be utilized. For example, helical coil 332 can comprise a plurality of coils (e.g., two coils) both forming separate electric circuits.

Furthermore, the recording head 300 also includes a pancake coil 334 that is wraps around the trailing back via 316. In one embodiment, an insulating material (not shown) electrically insulates the pancake coil 334 from the main pole 304 and from the trailing back via 316. In one implementation, an electric circuit that is separate from the circuit that is used to power the helical coil 332 powers the pancake coil 334. However, in an alternative implementation, same circuit is used to power both of the helical coil 332 and the pancake coil 334.

As a result of the energizing of the coils 332 and 334, a magnetic circuit is formed in the main pole 304, the leading return pole 310, the trailing return pole 312, the connecting vias 314 and 316, and a soft magnetic layer of the recording medium 302. The electric current flowing through the coils 332 and 334 induces magnetic flux that flows through such magnetic circuit formed in the recording head 300. In one implementation, where the pancake coil 334 is not energized and only the helical coil 332 is energized, the direction of the magnetic flux in through the recoding medium 302 is substantially perpendicular to the ABS 306.

Alternatively, when the pancake coil 334 is also energized, the magnetic flux in the trailing shield 322 increases. In one implementation, the pancake coil is energized such that the surface charge on the main pole tip 320 is positive and the surface charge on the trailing shield tip 326 is negative. The magnetization of the main pole tip 320 and the trailing shield tip 326 causes the angle of magnetization at the surface of the trailing shield 324 close to the main pole tip 320 to change. Specifically, the angle of the magnetic field 348 in the magnetic media changes from the direction substantially perpendicular to the ABS 306 and towards the trailing shield 322.

Such change in the angle of magnetization away from the direction perpendicular to the ABS 306 and directed more towards the trailing shield results in increased magnetic charge density at surface of trailing shield closest to made pole and leads in an increased field angle, larger magnetic wall angle, and larger write field gradient. Furthermore, such change in the angle of magnetization during the dynamic switching of the main pole also results in increased dynamic down-track gradient across a broad range of conditions.

Figure 4:
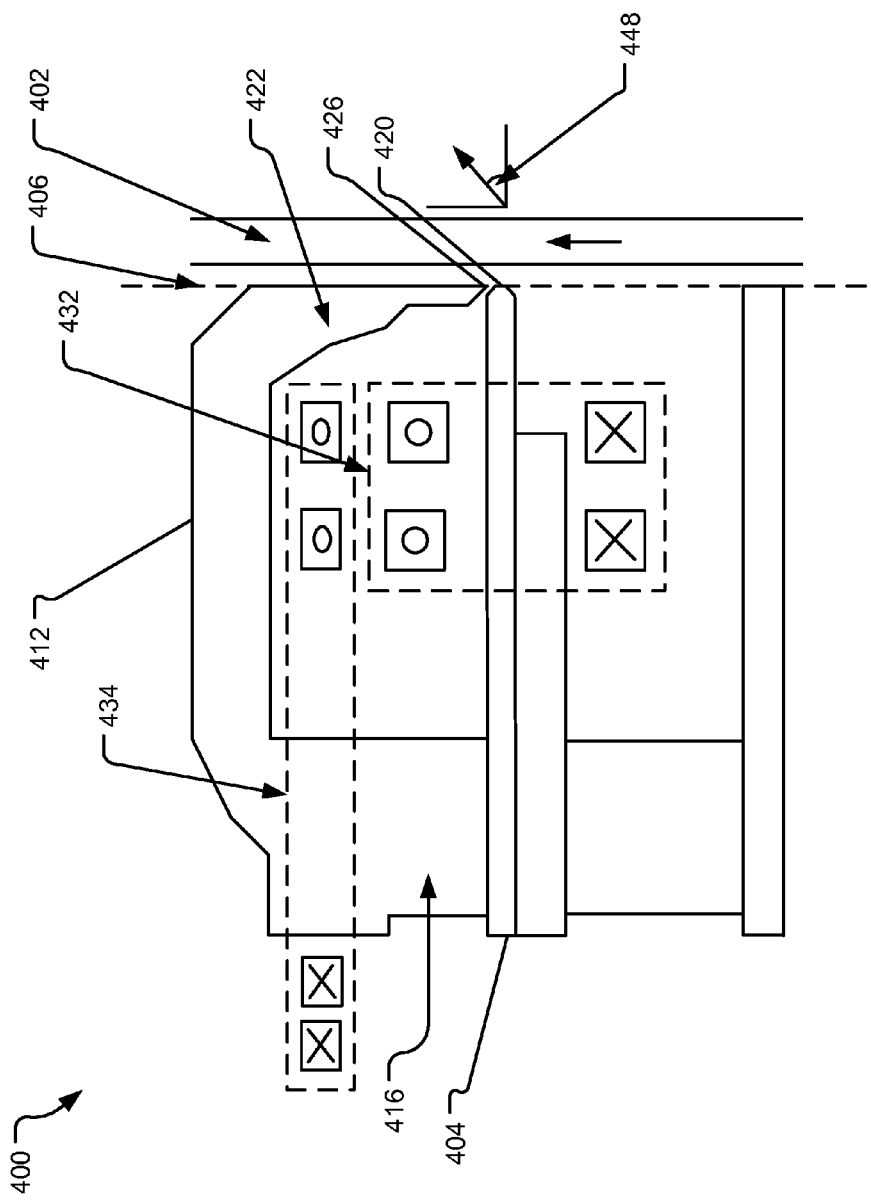
FIG. 4 illustrates an alternative implementation of a recording head including an asymmetric coil structure.

FIG. 4 illustrates an alternative implementation of a recording head 400 including an asymmetric coil structure. The recording head 400 is used to write information a magnetic recording medium 402. The recording head 400 includes a helical coil 432 wrapped around a main pole 404 and a pancake coil 434 wrapped around a trailing back via 416. Energizing the helical coil 432 and the pancake coil 434 causes magnetic flux to be generated in the main pole 404, the trailing return pole 412, and the trailing shield 422. Specifically, energizing the pancake coil 434 causes an increase in magnetic flux in the trailing shield 422 and an increase in the magnetic surface charge on the trailing shield tip 426. Similarly, it leads to magnetic flux density in the main pole 404 and magnetic surface charge on the main pole tip 420.

In one implementation, the pancake coil 434 is energized so that the surface charge on a main pole tip 420 is positive and the surface charge on a trailing shield tip 426 is negative. The magnetization of the main pole tip 420 and the trailing shield tip 426 causes the angle of magnetization at the surface of the trailing shield 422 close to the main pole tip 420 to change. Specifically, the angle of the magnetic field 448 in the magnetic media changes from the direction substantially perpendicular to the ABS 406 and towards the trailing shield 422. In other words, the tilting of the magnetic field towards the trailing shield 422 increases.

Figure 5:
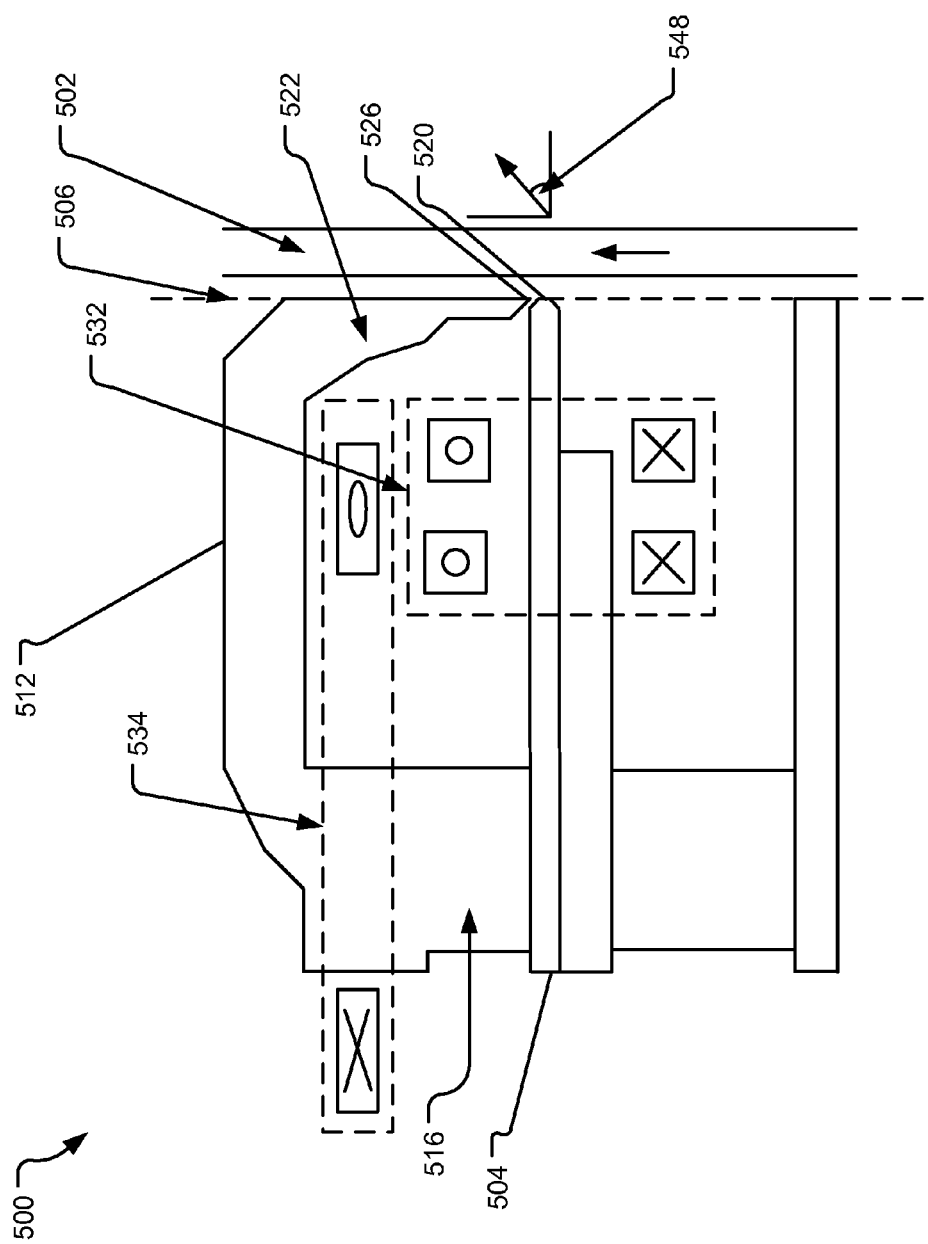
FIG. 5 illustrates another alternative implementation of a recording head including an asymmetric coil structure.

FIG. 5 illustrates another alternative implementation of a recording head 500 including an asymmetric coil structure. The recording head 500 is used to write information a magnetic recording medium 502. The recording head 500 includes a helical coil 532 wrapped around a main pole 504 and a pancake coil 534 wrapped around a trailing back via 516. The energization of the helical coil 532 and the pancake coil 534 causes magnetic flux to be generated in the main pole 504, the trailing return pole 512, and the trailing shield 522. Specifically, energizing the pancake coil 534 causes an increase in magnetic flux in the trailing shield 522 and an increase in the surface charge on the trailing shield tip 526. Similarly, energizing the pancake coil 534 causes magnetic flux density in the main pole 504 and a magnetic surface charge on the main pole tip 520.

In one implementation, the pancake coil 534 is energized so that the magnetic surface charge on a main pole tip 520 is positive and the magnetic surface charge on a trailing shield tip 526 is negative. The magnetization of the main pole tip 520 and the trailing shield tip 526 causes the angle of magnetization at the surface of the trailing shield 522 close to the main pole tip 520 to change. Specifically, the angle of the magnetic field 548 in the magnetic media changes from the direction substantially perpendicular to the ABS 506 and towards the trailing shield 522. In other words, the tilting of the magnetic field towards the trailing shield 522 increases.

Figure 6:
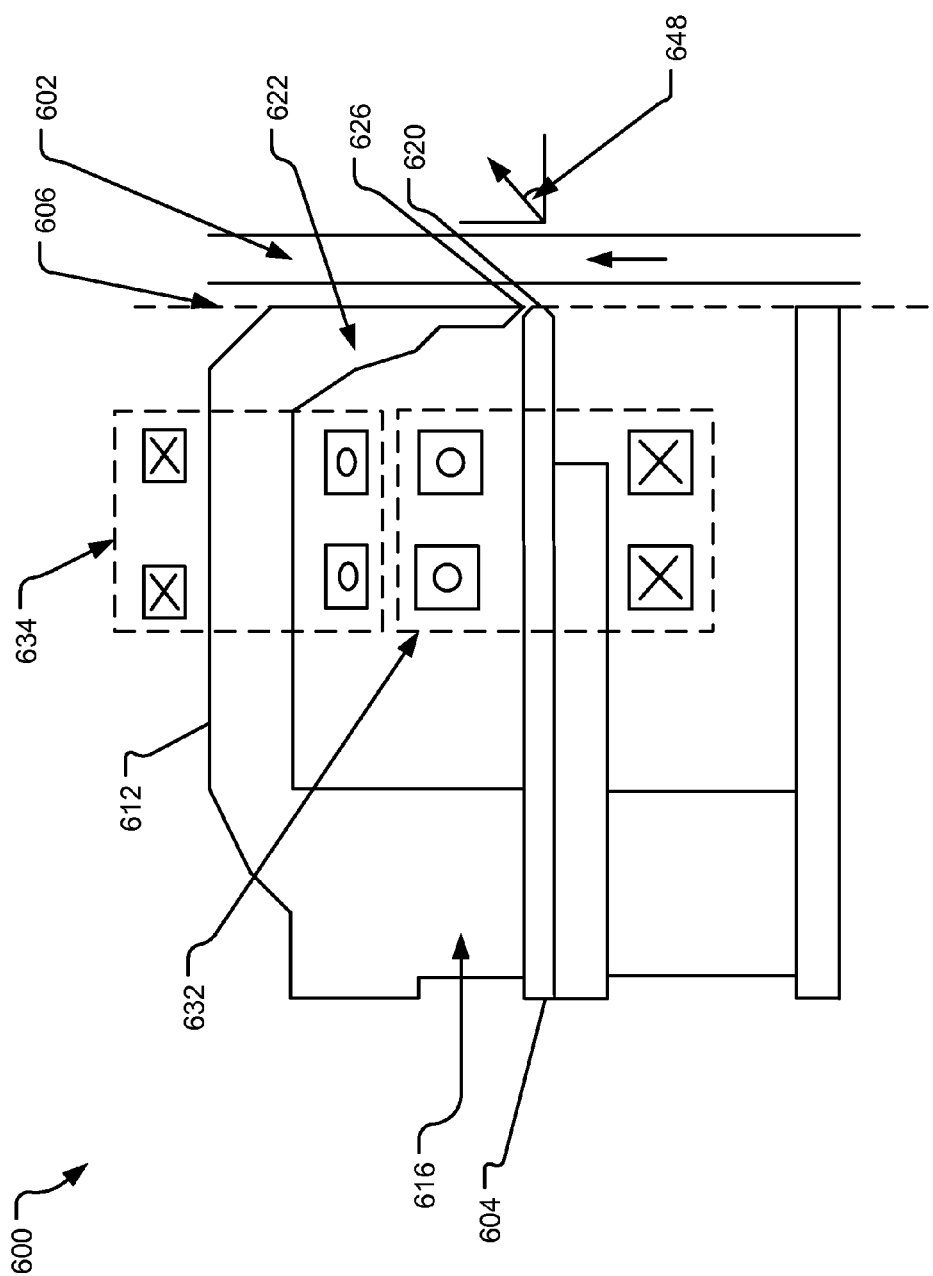
FIG. 6 illustrates another alternative implementation of a recording head including an asymmetric coil structure.

FIG. 6 illustrates another alternative implementation of a recording head 600 including an asymmetric coil structure. The recording head 600 is used to write information a magnetic recording medium 602. The recording head 600 includes a helical coil 632 wrapped around a main pole 604 and a pancake coil 634 wrapped around a trailing pole 612, which is connected to the main pole 604 through a trailing via 616. Energizing the helical coil 632 and the pancake coil 634 causes magnetic flux to be generated in the main pole 604, the trailing return pole 612, and the trailing shield 622. Specifically, energizing the pancake coil 634 causes an increase in magnetic flux in the trailing shield 622 and a magnetic surface charge density on the trailing shield tip 626. Similarly, it leads to magnetic density in the main pole 604 and magnetic surface charge on the main pole tip 620.

In one implementation, the pancake coil 634 is energized so that the surface charge on a main pole tip 620 is positive and the surface charge on a trailing shield tip 626 is negative. The magnetization of the main pole tip 620 and the trailing shield tip 626 causes the angle of magnetization at the surface of the trailing shield 622 close to the main pole tip 620 to change. Specifically, the titling of the angle of the magnetic field 648 away from the direction substantially perpendicular to the ABS 606 increases. As a result, the magnetic field in the magnetic media tilts substantially away from the direction perpendicular to the ABS 606. In other words, the angle of the magnetic field 648 increases.

Figure 7:
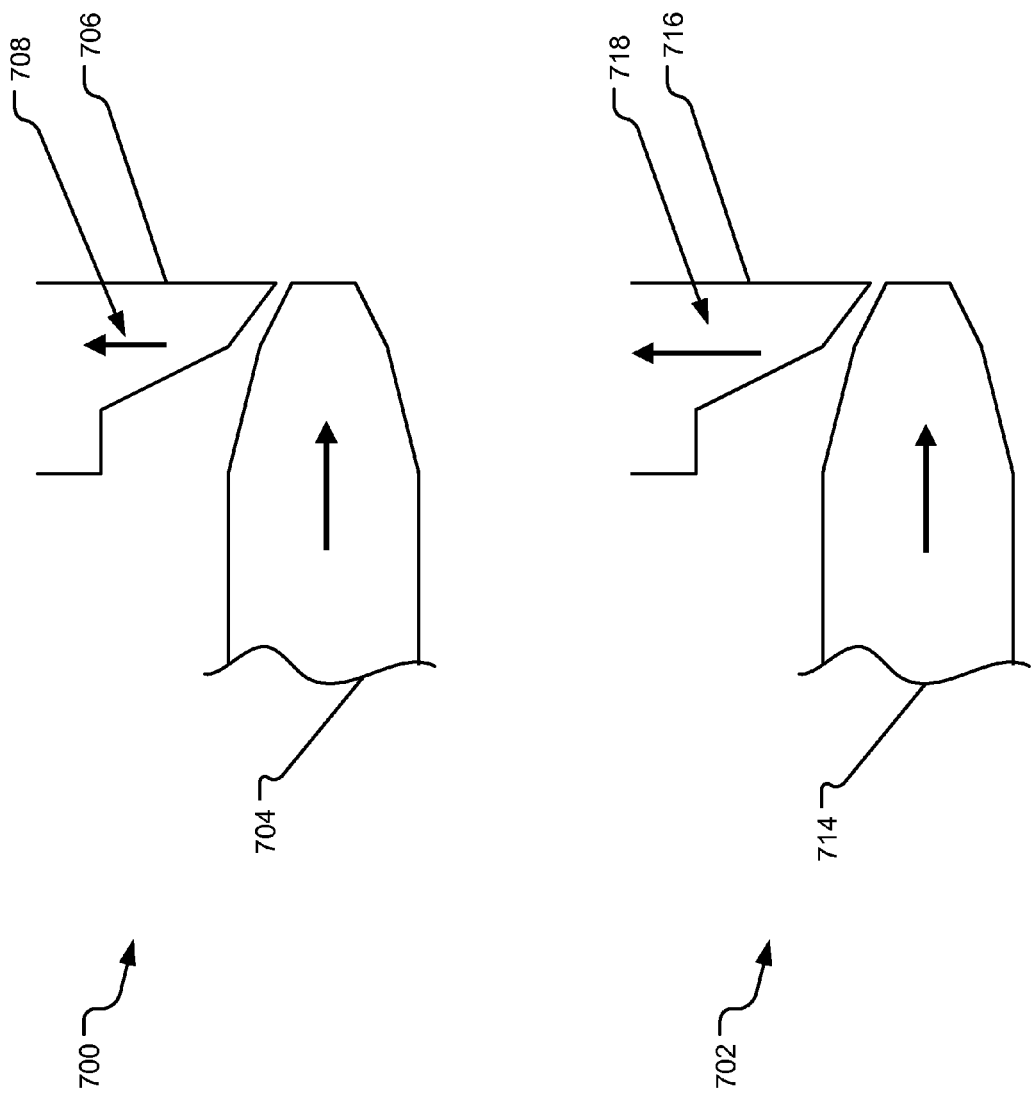
FIG. 7 illustrates the magnetic flux density in a recording head.

FIG. 7 illustrates the magnetic flux density in a recording head implemented herein. Specifically, the section of the recording head 700 discloses the magnetic flux density in the main pole 704 and the trailing shield 706 when the energization of the coils around the main pole 704 is balanced. Thus, for example, the recording head 700 shows magnetic flux densities when the number of coil turns on the front side of the main pole 704 is the same as the number of coil turns on the trailing side (towards the trailing shield 706) of the main pole 704.

On the other hand, the recording head 702 discloses the magnetic flux density in the main pole 714 and the trailing shield 716 when the energization of the coils around the main pole 714 is not balanced. Thus, for example, the recording head 702 shows magnetic flux densities when the number of coil turns on the front side of the main pole 714 is higher than the number of coil turns on the trailing side of the main pole 714. As shown by the size or arrow 708 compared to the size of the arrow 718, the magnetic flux density in the trailing shield 716 is larger in the recording head 702 with more turns of coils on the trailing side (towards the trailing shield 716) of the main pole 714 compared to the turns of coils on the front side of the main pole 714.

Figure 8:
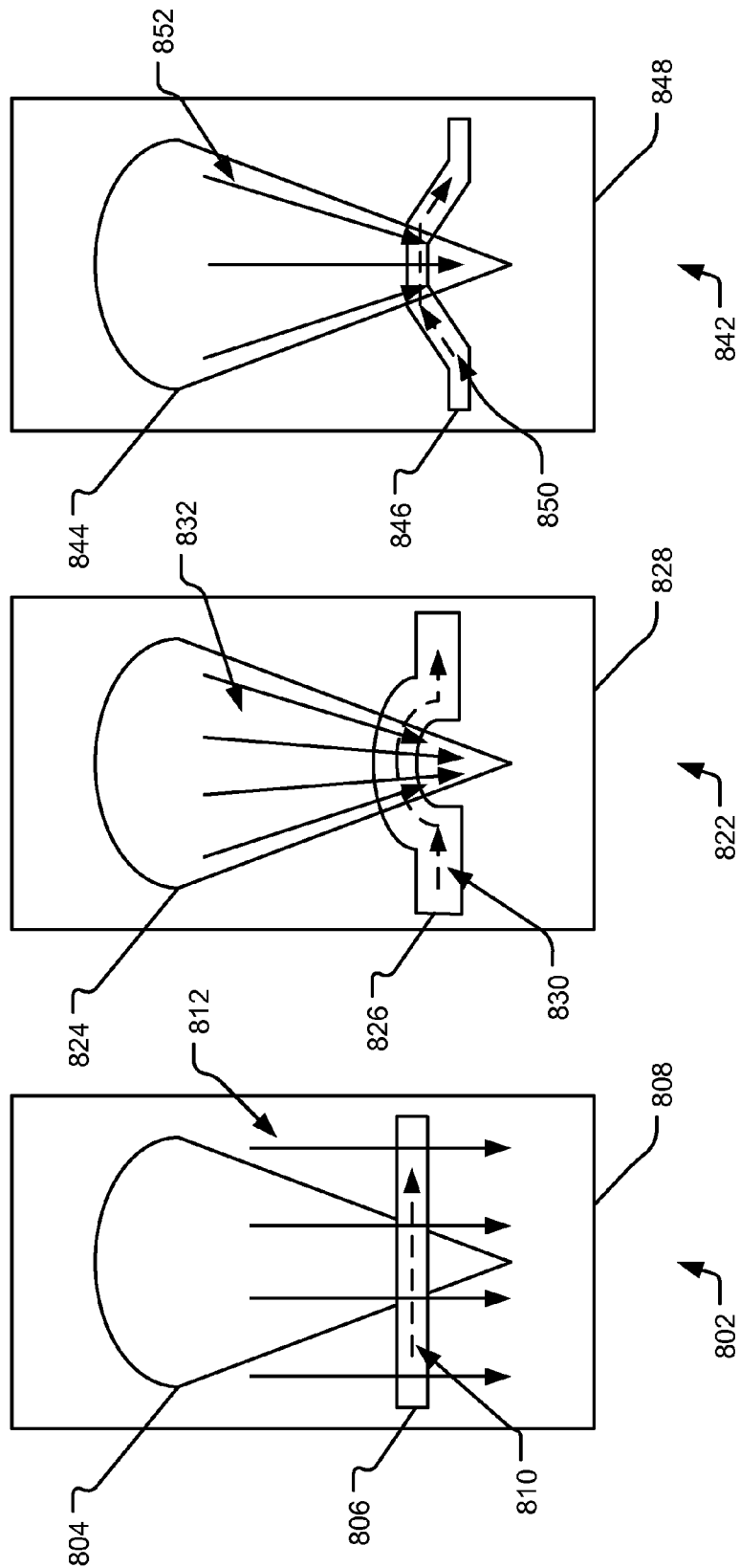
FIG. 8 illustrates various alternative top-down cross-sectional views of the coil structures used with the recording head.

FIG. 8 illustrates various alternative top-down cross-sectional views of the coil structures used with the recording head. Specifically, each top-down cross-sectional views of FIG. 8 illustrate one coil-wire of the coil structure between the main pole and the trailing pole of the recording head. For example, an implementation 802 illustrates a main pole 804 and a coil-wire 806 that is substantially parallel to the ABS 808. The coil-wire 806 carries electric current as illustrated by arrow 810, in the direction from left to right. The magnetic field generated by the current 810 in the coil wire 806, as given by the right-hand rule is in the direction perpendicular to the ABS 808 and towards the ABS 808. Such magnetic field is illustrated by the arrows 812.

An alternative implementation 822 illustrates a main pole 824 and a coil-wire 826 that is arranged as a curve compared to the ABS surface 828. The coil-wire 826 carries electric current as illustrated by arrow 830, in the direction from left to right. The magnetic field generated by the current 830 in the coil wire 826, as given by the right-hand rule is in the direction towards the ABS 828 and the magnetic field is focused towards the tip of the main pole β824. Such magnetic field is illustrated by the arrows 832. The coil wire 826 increases the flux density at the tip of the main pole 824 and improves the switching dynamics of the main pole 824.

Another alternative implementation 842 illustrates a main pole 844 and a coil-wire 846 that is arranged as a piecewise linear curve compared to the ABS surface 848. The coil-wire 846 carries electric current as illustrated by arrow 850, in the direction from left to right. The magnetic field generated by the current 850 in the coil wire 846, as given by the right-hand rule is in the direction towards the ABS 848 and the magnetic field is focused towards the tip of the main pole 844. Such magnetic field is illustrated by the arrows 852. The coil wire 846 increases the flux density at the tip of the main pole 844 and improves the switching dynamics of the main pole 844.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A device comprising:
   a coil apparatus asymmetric with respect to a main pole and configured to generate more magnetic flux on one side of the main pole than magnetic flux on other side of the main pole; the coil apparatus comprising:
   a helical coil wrapped around the main pole, and
   a pancake coil positioned between the main pole and a return pole and wherein at least part of the pancake coil is located, in a down track direction, between the return pole and the helical coil.

2. The device of claim 1, wherein the return pole being attached to a return shield, wherein the coil apparatus is configured to increase the magnetic flux density in the return shield.

3. The device of claim 1, wherein the helical coil is configured to increase flux density at a tip of the main pole compared to flux density away from the tip of the main pole.

4. The device of claim 1, wherein the helical coil includes a curved coil wire that is partially curved away from an air-bearing surface of the device.

5. The device of claim 1, wherein the helical coil includes a piecewise linear curved coil wire that is partially curved away from an air-bearing surface of the device.

6. The device of claim 1, wherein the coil apparatus further comprises a helical coil wrapped around the return pole.

7. The device of claim 1, wherein the coil apparatus is configured to increase magnetic flux density in the return pole.

8. The device of claim 1, wherein the coil apparatus is configured to generate magnetic flux in a return shield to change an angle of magnetization in a magnetic media at an air bearing surface close to the main pole.

9. A device for a recording head, comprising:
   a coil apparatus asymmetric with respect to a main pole and configured to generate more magnetic flux on one side of the main pole than the magnetic flux on other side of the main pole; the coil apparatus comprising:
   a pancake coil wrapped around a back via; and
   a helical coil wrapped around the main pole, wherein at least part of the pancake coil is located, in a down track direction, between a return pole and the helical coil.

10. The device of claim 9, wherein the coil apparatus is configured to carry a current with higher total amperage in the coils between the main pole and the return pole compared to a current carried in the coils on other side of the main pole.

11. The device of claim 9, wherein the pancake coil increases magnetic flux in a return shield connected to the return pole.

12. The device of claim 9, wherein the coil apparatus further comprising at least one helical coil wrapped around the return pole.

13. The device of claim 9, wherein the helical coil wrapped around the main pole is configured to increase flux density at a tip of the main pole compared to flux density away from the tip of the main pole.

14. The device of claim 9, wherein the helical coil wrapped around the main pole includes a curved coil wire that is partially curved away from an air-bearing surface of the device.

15. A device, comprising:
   a write pole;
   a return pole; and
   a coil apparatus configured to generate an imbalance in magnetic field density around the write pole,
   wherein the coil apparatus comprising a first coil structure positioned between the main pole and the return pole wherein the first coil structure is configured to increase flux density at a tip of the main pole compared to flux density away from the tip of the main pole.

16. The device of claim 15, wherein the first coil structure further comprises a helical coil wrapped around the main pole.

17. The device of claim 15, wherein the coil apparatus further comprising a pancake coil positioned between the main pole and a return pole.

18. The device of claim 17, wherein at least part of the pancake coil is located, in a down track direction, between the return pole and the helical coil.

19. The device of claim 18, wherein the pancake coil is configured to generate magnetic flux in a return shield to change an angle of magnetization in a magnetic media at an air bearing surface close to the main pole.

20. The device of claim 15, wherein the coil apparatus further comprises another helical coil wrapped around the return pole.

* * * * *